US011936134B2

(12) United States Patent
Baldus-Kunze et al.

(10) Patent No.: US 11,936,134 B2
(45) Date of Patent: Mar. 19, 2024

(54) COAXIAL CONNECTOR ASSEMBLY HAVING LOCKING FERRULE

(71) Applicant: Corning Optical Communications RF LLC, Glendale, AZ (US)

(72) Inventors: Søren Baldus-Kunze, Slagelse (DK); Nikolaj Slobodziuk, Vordingborg (DK)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 32 days.

(21) Appl. No.: 17/570,479

(22) Filed: Jan. 7, 2022

(65) Prior Publication Data

US 2022/0224045 A1 Jul. 14, 2022

Related U.S. Application Data

(60) Provisional application No. 63/217,111, filed on Jun. 30, 2021, provisional application No. 63/135,560, filed on Jan. 8, 2021.

(51) Int. Cl.

| | |
|---|---|
| ***H01R 13/58*** | (2006.01) |
| ***H01R 24/56*** | (2011.01) |
| ***H01R 43/28*** | (2006.01) |
| ***H01R 103/00*** | (2006.01) |

(52) U.S. Cl.
CPC ....... *H01R 13/5825* (2013.01); *H01R 24/564* (2013.01); *H01R 43/28* (2013.01); *H01R 2103/00* (2013.01)

(58) Field of Classification Search
CPC .............. H01R 13/5219; H01R 9/0518; H01R 2103/00; H01R 43/28; H01R 24/564; H01R 13/5825
See application file for complete search history.

(56) References Cited

U.S. PATENT DOCUMENTS

| | | |
|---|---|---|
| 4,834,676 A | 5/1989 | Tackett |
| 7,008,263 B2 | 3/2006 | Holland |
| 7,077,700 B2 | 7/2006 | Henningsen |

(Continued)

FOREIGN PATENT DOCUMENTS

| | | |
|---|---|---|
| EP | 1503462 A1 | 2/2005 |
| EP | 2190069 B1 | 4/2012 |

(Continued)

OTHER PUBLICATIONS

International Search Report and Written Opinion of the International Searching Authority; PCT/US2022/011842; dated Jun. 9, 2022; 5 pages; US Patent Office.

*Primary Examiner* — Jean F Duverne
(74) *Attorney, Agent, or Firm* — Tamika A. Crawl-Bey

(57) ABSTRACT

Disclosed herein is a connector assembly for attachment to a corrugated coaxial cable. The assembly includes: a rearward outer body, to be received over a portion of the corrugated coaxial cable, comprising a recessed area; and a locking ferrule, to be inserted into the rearward outer body, comprising a plurality of ridges. At least one of the plurality of ridges is configured for engagement with the corrugated outer conductor. The connector assembly further comprises a foot portion positionable within the recessed area such that upon coupling of the rearward outer body with the locking ferrule, the corrugated outer conductor is locked in position.

12 Claims, 5 Drawing Sheets

(56) References Cited

U.S. PATENT DOCUMENTS

| | | | | |
|---|---|---|---|---|
| 7,108,547 | B2 | 9/2006 | Kisling et al. | |
| 7,112,093 | B1 | 9/2006 | Holland | |
| 7,264,502 | B2 | 9/2007 | Holland | |
| 7,465,190 | B2 | 12/2008 | Henningsen | |
| 7,731,529 | B1 | 6/2010 | Islam | |
| 7,857,661 | B1 | 12/2010 | Islam | |
| 7,922,529 | B1 | 4/2011 | Meurer | |
| 8,287,309 | B1 | 10/2012 | Thomas et al. | |
| 9,633,765 | B2 | 4/2017 | Natoli et al. | |
| 2004/0257169 | A1 | 12/2004 | Nelson | |
| 2005/0159044 | A1 | 7/2005 | Harwath et al. | |
| 2005/0277330 | A1 | 12/2005 | Kisling et al. | |
| 2006/0148315 | A1 | 7/2006 | Andreescu | |
| 2006/0160416 | A1 | 7/2006 | Burris et al. | |
| 2007/0087626 | A1 | 4/2007 | Harwath | |
| 2010/0035457 | A1 | 2/2010 | Holliday | |
| 2012/0088404 | A1 * | 4/2012 | Wild | H01R 9/0521 439/584 |
| 2013/0143439 | A1 * | 6/2013 | Nugent | H01R 24/564 439/585 |
| 2014/0045357 | A1 * | 2/2014 | Nugent | H01R 43/005 29/857 |
| 2014/0148044 | A1 | 5/2014 | Balcer et al. | |

FOREIGN PATENT DOCUMENTS

| | | | |
|---|---|---|---|
| GB | 2448595 | A | 10/2008 |
| JP | 2012-516544 | A | 7/2012 |
| KR | 10-1116060 | B1 | 2/2012 |
| WO | 2013/186586 | A1 | 12/2013 |

* cited by examiner

COAXIAL CONNECTOR ASSEMBLY HAVING LOCKING FERRULE

CROSS-REFERENCE TO RELATED APPLICATIONS

This application claims the benefit of priority under 35 U.S.C. § 119 of U.S. Provisional Application Ser. No. 63/217,111, filed Jun. 30, 2021, and U.S. Provisional Application Ser. No. 63/135,560, filed Jan. 8, 2021, the content of which is relied upon and incorporated herein by reference in its entirety.

BACKGROUND

The present disclosure generally relates to coaxial connector assemblies, and particularly a coaxial connector assembly, having a locking ferrule.

A coaxial cable is characterized by having an inner electrical conductor, an outer electrical conductor, and a dielectric between the inner and outer electrical conductors. The inner electrical conductor may be hollow or solid. At the end of coaxial cable, a connector or connector assembly is attached to allow for mechanical and electrical coupling of the coaxial cable.

Connectors and connector assemblies for attachment to coaxial cables have been used throughout the coaxial cable industry for a number of years. One type of coaxial cable has an annularly corrugated outer conductor and a plain cylindrical inner conductor. Generally, connectors and connector assemblies that attach to these types of coaxial cables are different from those where the outer electrical conductors are smooth or uncorrugated.

For example, one connector assembly type includes a single annular clamping portion that meshes with the last valley or outermost valley of the corrugated outer conductor, providing a single circumferential point of contact. Without additional axial reinforcement from the coaxial cable connector, physical gyrations of the cable found in field applications due to weather and vibration can cause undue stress and, ultimately, material fatigue of the corrugated cable outer conductor.

The aforementioned example clearly shows there is a continuing need for improved high-performance coaxial cable connectors and connector assemblies. There is a particular need for connectors and connector assemblies that can be installed and uninstalled easily and quickly under field conditions. Also, since these connectors and connector assemblies are generally installed in the field, they should be configured for pre-assembly, so that the possibility of dropping and losing small parts, misplacing o-rings, damaging or improperly lubricating o-ring, or other assembly errors in the field are minimized. Additionally, it should be possible for the coaxial cable connector to be installed and removed without the use of any special tools.

In view of the aforementioned needs, as well as other issues with prior connector and connector assembly designs, alternatives are desired.

The figures and photographs are not necessarily to scale. Like numbers used in the figures and the photographs may be used to refer to like components. However, it will be understood that the use of a number to refer to a component in a given figure or photograph is not intended to limit the component in another figure labeled with the same number.

DETAILED DESCRIPTION

Various exemplary embodiments of the disclosure will now be described with particular reference to the drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the features and limitations set forth in the claims and any equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

Figure 1:
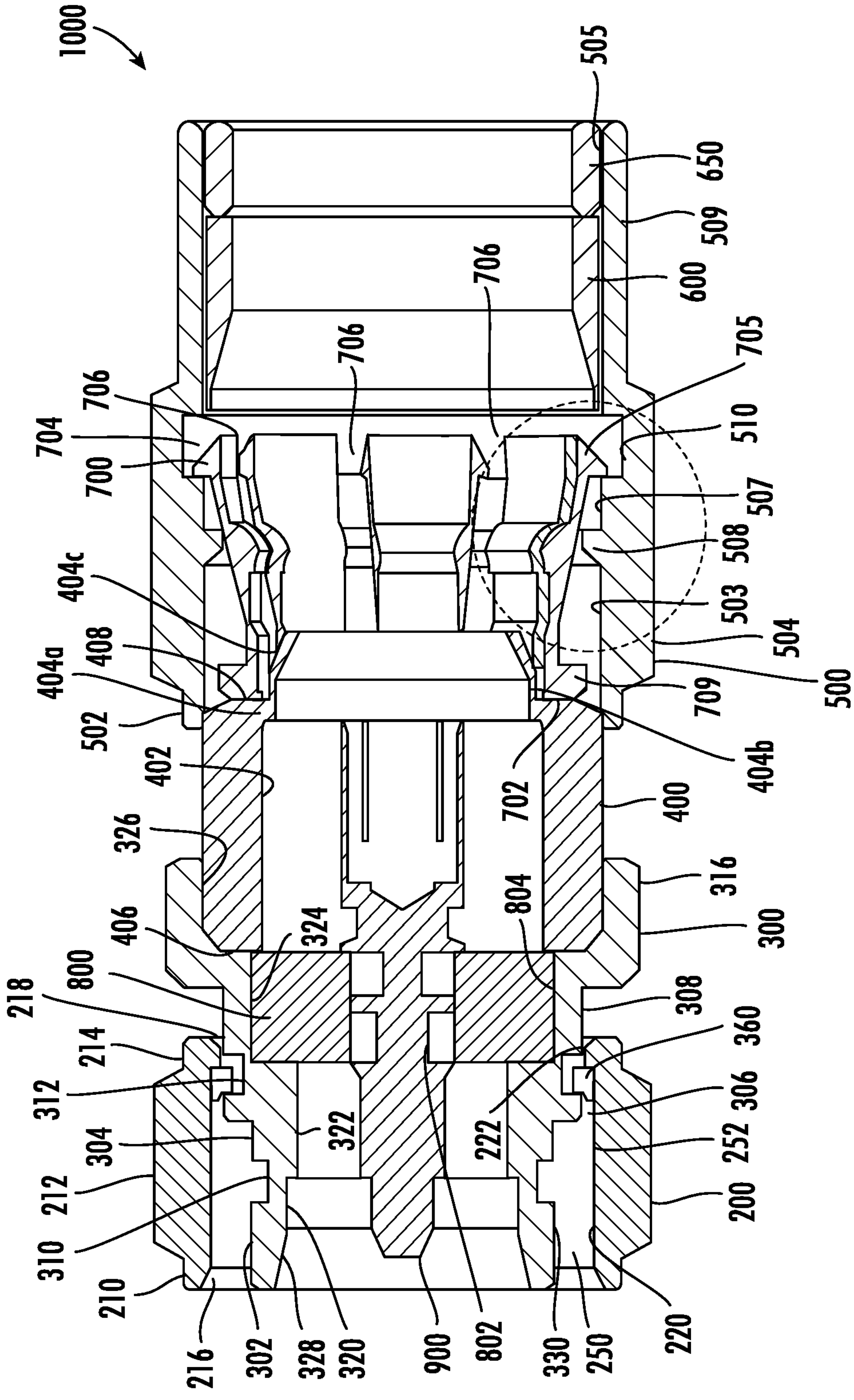
FIG. 1 is a cross-sectional view of a coaxial connector assembly in accordance with embodiments disclosed herein.
Figure 2:
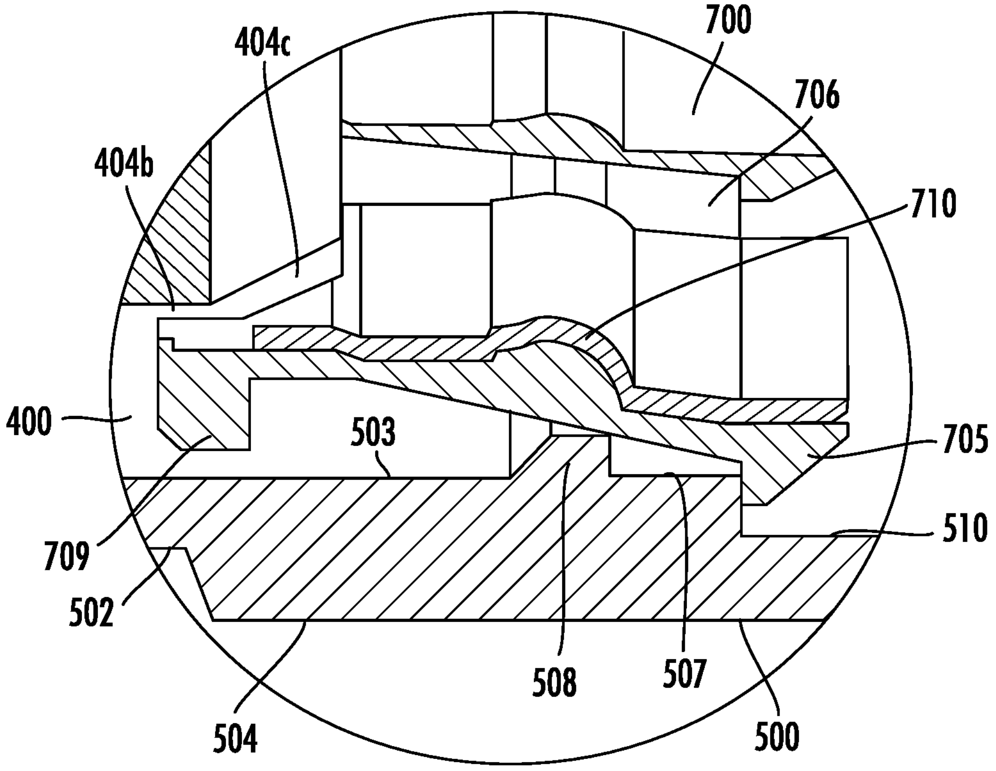
FIG. 2 is an enlarged detail view, Detail 2-2, of a portion of the coaxial connector assembly shown in FIG. 1.

As shown particularly in FIG. 1, disclosed herein is an embodiment of a coaxial connector assembly 1000. This embodiment of the coaxial connector assembly 1000 includes a forward outer body 200, a forward inner body

250, an intermediate body 300, a post 400, a rearward outer body 500, a first rear inner body 600, a second rear inner body 650, a locking ferrule 700, a dielectric 800, and a center conductor 900. In addition, the coaxial connector assembly 1000 also includes seals 330, 360. Additional seals may also be incorporated, depending on the environmental needs of a particular application. Moreover, the particular structure of the coaxial connector assembly 1000, as shown in FIG. 1, should not be construed as limiting. The connector assembly may include additional or fewer elements, depending upon various factors. Such factors include, but are not limited to environmental conditions, cost, ease of assembly, and ease of manufacture.

The forward outer body 200, which may also be referred to as a nut, is rotatably attached to the intermediate body 300. This particular construction of the forward outer body 200 includes a plurality of body portions at various heights. Specifically, the forward outer body 200 includes an outer end body portion 210, an intermediate body portion 212, an inner end portion 214, chamfers 216, 218 positioned at each end, a bore 220, and a lip 222. The forward outer body 200 may also include engaging means such as threads.

The forward inner body 250 is positioned between the forward outer body 200 and the intermediate body 300. The forward inner body 250 is configured to mate with the outer configuration of the intermediate body. The forward inner body 250 includes an outer surface 252 in sliding engagement with the bore 220 of the forward outer body 200.

The intermediate body 300 includes a plurality of outer step portions 302, 304, 306, 308 with grooves 310, 312 positioned between step portions 302, 304 and 306, 308. The intermediate body 300 also includes a plurality of inner step portions 320, 322, 324, 326 and an angled end portion 328.

The post 400 is fit within the inner step portion 326 of the intermediate body 300. The post 400 includes a post bore 402, and a tang 404. The tang 404 extends inwardly to couple with the locking ferrule 700. The tang 404 includes a forward tang portion 404*a*, an intermediate tang portion 404*b*, and a rearward tang portion 404*c*. The forward tang portion 404*a* extends radially inward, the intermediate tang portion 404*b* is integrally attached to the forward tang portion 404*a* and extends axially toward the locking ferrule 700. The rearward tang portion 404*c* is inwardly angled for engagement with the locking ferrule 700. The rearward tang portion 404*c* is may be flexible such that upon engagement with the locking ferrule 700, the rearward tang portion 404*c* is inwardly and outwardly movable. The post 400 also includes end surfaces 406, 408, which respectively engage with the intermediate body 300 and the locking ferrule 700.

Referring to FIGS. 1, 2, 4, and 5, the rearward outer body 500 is configured for engagement with the post 400, the locking ferrule 700, the first rear inner body 600, and the second rear inner body 650. The rearward outer body 500 includes a plurality of outer sections: two end outer sections 502, 506, and a middle outer body section 504. The middle outer body section 504 preferably has a larger diameter than the two end outer sections 502, 506. The rearward outer body 500 includes two end rearward outer body bores 503, 505, a middle outer body bore 507, a sloped engagement element 508, and a recessed area 510.

Figure 4:
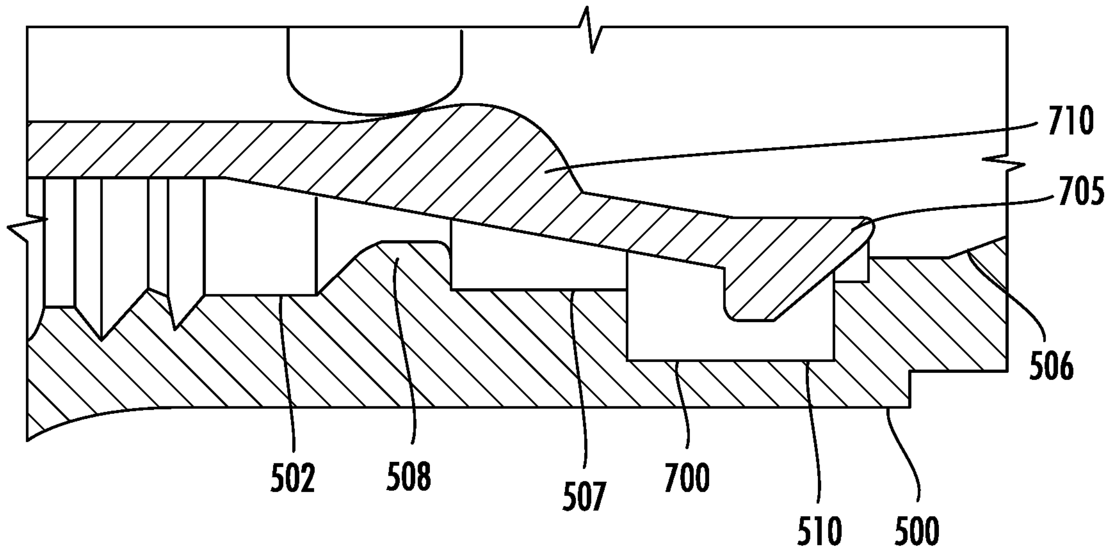
FIG. 4 is a photograph of a cross-section of a coaxial connector assembly in a first position in accordance with embodiments disclosed herein.
Figure 5:
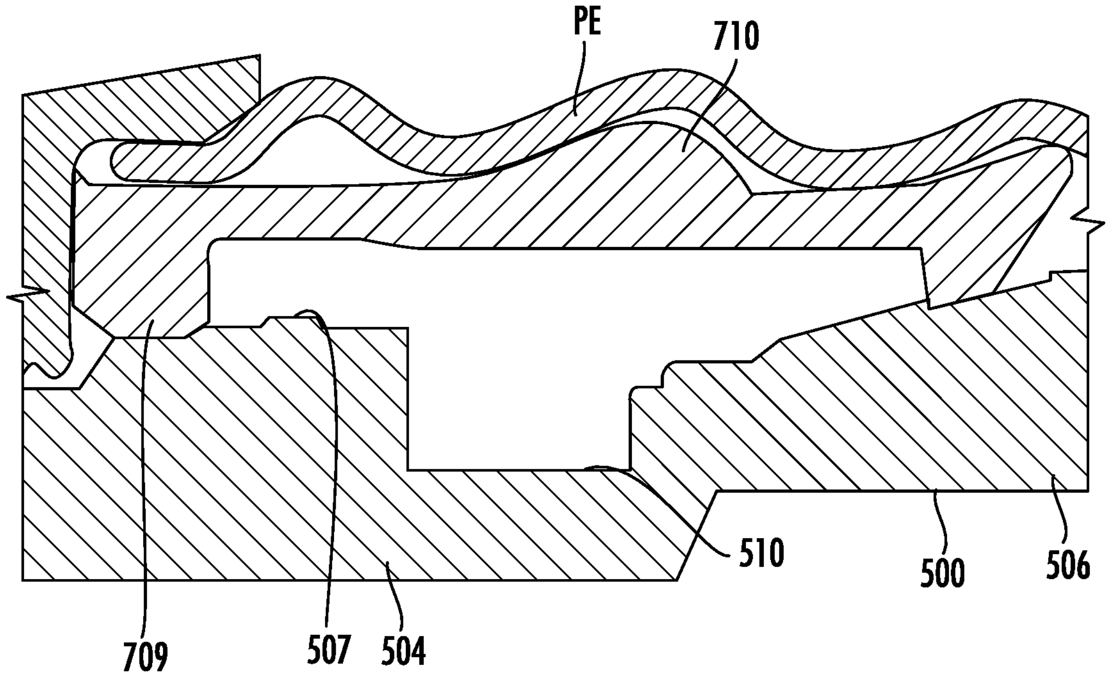
FIG. 5 is a photograph of a cross-section of the coaxial connector assembly, shown in FIG. 4, in a second position in accordance with embodiments disclosed herein.

The locking ferrule 700 and the first rear inner body 600 and the second rear inner body 650 are configured for positioning onto a prepared end PE of a corrugated coaxial cable 100, which includes a corrugated outer conductor 125 (FIGS. 4 and 5). The locking ferrule 700 includes a front ferrule end 702, a back ferrule end 704 having a plurality of foot portions 705, a plurality of slots 706, a tapered surface 708, an inwardly extending projection 709, and a plurality of ridges 710. The front ferrule end 702 is configured to engage with the post 400. The plurality of ridges 710 are configured to engage with valleys in the corrugated coaxial cable 100, as shown particularly in FIGS. 4 and 5. And the back ferrule end 704 is configured for engagement with a recessed area 510 in the rearward outer body 500 in a first position, shown in FIG. 4, and the first rear inner body 600 in a second position, as shown in FIG. 5. In the first position shown in FIG. 4, the cable 100 has been installed into the rearward outer body and the ferrule. When the cable is inserted, the peaks of the corrugated outer conductor presses the ferrule outwardly, making room for the ferrule to move forward. Once over the peaks of the corrugated cable, ridges of the ferrule fall into place, locking the cable. In the second position shown in FIG. 5, the rearward outer body 500 has been tightened such that the locking ferrule 700 moves inwardly, locking the corrugated outer conductor even more and applying pressure on the cable moving the cable into the second position. In this stage of the compression, a portion of the locking ferrule is reduced in diameter, locking the corrugated outer conductor between the post 400 and the locking ferrule 700.

The plurality of slots 706 in the locking ferrule 700 provide the locking ferrule 700 with spring-like characteristics. Accordingly, the plurality of slots 706 facilitate spring-like engagement of the locking ferrule 700 upon coupling with the corrugated outer conductor 125, the rearward outer body 500 and the first rear inner body 600. The plurality of ridges 710 also facilitate engagement with the corrugated outer conductor 125 by nature of the ridges themselves, resulting in a locking effect. This locking effect is used to effectively hold the cable in position during installation, assists in seating the cable properly during tightening of the assembly, and locks the cable in position upon completion of the installation process.

The dielectric 800 can be manufactured from various materials, including TPX® Polymethylpentene polymer; PTFE Teflon®, and TOPAS® plastic. The dielectric 800 is preferably solid with a central bore 802 extending therethrough. Optionally, the dielectric can include a series of radially-spaced holes, which may be used to maintain the characteristic impedance of the transmission path and thereby minimize signal reflections.

The center conductor 900 extends through the central bore 802 of the dielectric and is supported thereby. The center conductor 900 extends between a first end formed as a male pin and an opposing second end formed as a compressible female socket, extending within the post.

Figure 3:
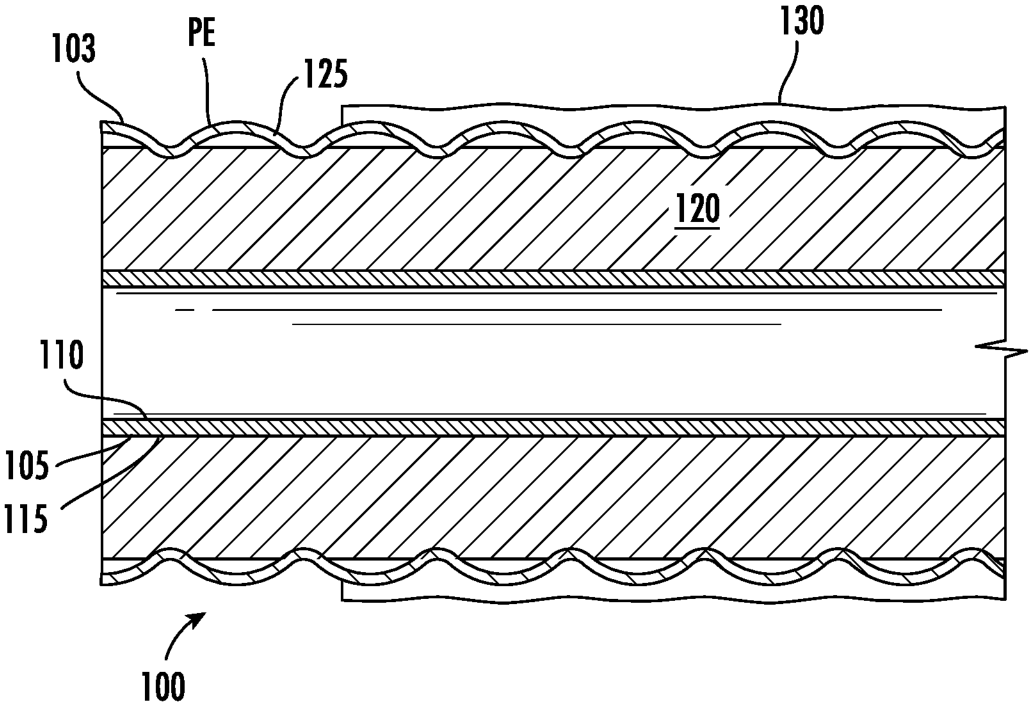
FIG. 3 is a cross-sectional view of an exemplary coaxial cable.

Referring to FIG. 3, the cable 100 generally includes at least a center conductor 105, a cable dielectric 120, a corrugated outer conductor 125, and a jacket 130. The center conductor 105 is annular and thus includes an inner diameter 110 and an outer diameter 115. A cable dielectric 120 surrounds the outer diameter 115 of the center conductor 105, while the corrugated outer conductor 125 surrounds the cable dielectric 120, and the jacket 130 surrounds the corrugated outer conductor 125. In FIG. 3, a forward end 103 of the corrugated coaxial cable 100 is shown in a "prepared state," meaning that an end of the corrugated coaxial cable 100 a portion of the jacket 130 has been removed such that the corrugated outer conductor 125 is fully exposed and ready for positioning in the coaxial connector assembly 1000.

As shown particularly in FIGS. 4 and 5, the locking ferrule 700 is configured to substantially engage with the corrugated outer conductor 125 of the corrugated coaxial cable 100 after the jacket 130 has been stripped back to expose a portion of the corrugated outer conductor 125.

Each component is preferably made of at least one metallic material, such as brass or another comparable material, and can also be plated with at least one conductive material, such as nickel-tin.

For the purposes of describing and defining the subject matter of the disclosure it is noted that the terms "substantially" and "generally" may be utilized herein to represent the inherent degree of uncertainty that may be attributed to any quantitative comparison, value, measurement, or other representation.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A connector assembly for attachment to a corrugated coaxial cable, the corrugated coaxial cable comprising a center conductor, a cable dielectric surrounding the center conductor, and a corrugated outer conductor, having peaks and valleys, surrounding the cable dielectric, the coaxial connector assembly comprising:

a rearward outer body to be received over a portion of the corrugated coaxial cable, the rearward outer body comprising a recessed area; and a locking ferrule to be inserted into the rearward outer body, the locking ferrule comprising a front ferrule end, configured to engage with a post, the front ferrule end having a plurality of foot portions and a back ferrule end having a plurality of ridges, wherein at least one of the ridges is configured for engagement with peaks of the corrugated outer conductor, and at least one of the plurality of foot portions is positionable within the recessed area such that upon coupling of the rearward outer body with the locking ferrule, the corrugated outer conductor is locked between the post and the locking ferrule.

2. The connector assembly of claim 1, wherein the locking ferrule comprises a plurality of ridges and wherein at least one of the plurality of ridges engages a valley of the corrugated outer conductor.

3. The connector assembly of claim 1, wherein the locking ferrule comprises a front ferrule end having an inwardly extending projection configured to engage with the post.

4. The connector assembly of claim 1, wherein the locking ferrule comprises a plurality of slots that facilitate spring-like engagement with the corrugated outer conductor upon assembly with the rearward outer body.

5. The connector assembly of claim 1, wherein the locking ferrule is configured for sliding engagement with the rearward outer body.

6. The connector assembly of claim 1, wherein the locking ferrule is configured for sliding engagement with a sloped engagement element of the rearward outer body.

7. The connector assembly of claim 1, further comprising a post configured for engagement with the locking ferrule.

8. The connector assembly of claim 7, wherein the post comprises a post bore and a tang.

9. The connector assembly of claim 1, further comprising an intermediate body configured for engagement with the post.

10. The connector assembly of claim 9, wherein the intermediate body comprises a plurality of outer step portions having at least one groove positioned therein.

11. The connector assembly of claim 9, further comprising a forward outer body configured for engagement with the intermediate body.

12. The connector assembly of claim 11, wherein the forward outer body comprises an outer end body portion, an intermediate body portion coupled to the outer end body portion, and an inner end portion coupled to the intermediate body portion.

* * * * *